(12) United States Patent
Kwun et al.

(10) Patent No.: US 9,521,553 B2
(45) Date of Patent: Dec. 13, 2016

(54) COMMUNICATION APPARATUS AND METHOD IN BROADBAND WIRELESS COMMUNICATION SYSTEM

(75) Inventors: Jong-Hyung Kwun, Seongnam-si (KR); Cheol-Woo You, Seoul (KR); Sung-Hyun Cho, Suwon-si (KR); Sungho Jeon, Busan (KR); Sanghoon Lee, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 1725 days.

(21) Appl. No.: 11/779,588

(22) Filed: Jul. 18, 2007

(65) Prior Publication Data
US 2008/0019309 A1  Jan. 24, 2008

(30) Foreign Application Priority Data
Jul. 18, 2006 (KR) .............................. 2006-0066791

(51) Int. Cl.
| | |
|---|---|
| H04W 4/00 | (2009.01) |
| H04J 1/00 | (2006.01) |
| H04W 16/02 | (2009.01) |
| H04L 5/00 | (2006.01) |
| H04W 56/00 | (2009.01) |
| H04W 88/08 | (2009.01) |

(52) U.S. Cl.
CPC ............ *H04W 16/02* (2013.01); *H04L 5/0053* (2013.01); *H04L 5/0062* (2013.01); *H04L 5/0007* (2013.01); *H04W 56/00* (2013.01); *H04W 88/08* (2013.01)

(58) Field of Classification Search
CPC ............................ H04W 28/044; H04W 72/04
USPC .................................................. 370/329, 343
See application file for complete search history.

(56) References Cited

U.S. PATENT DOCUMENTS

| | | | |
|---|---|---|---|
| 2002/0122406 A1* | 9/2002 | Chillariga et al. ............ | 370/347 |
| 2002/0137464 A1* | 9/2002 | Dolgonos et al. .............. | 455/60 |
| 2004/0252801 A1* | 12/2004 | Boles et al. .................. | 375/355 |

FOREIGN PATENT DOCUMENTS

| | | |
|---|---|---|
| EP | 1 411 648 | 4/2004 |
| KR | 1020040035291 | 4/2004 |
| KR | 1020050120431 | 12/2005 |
| KR | 1020050122795 | 12/2005 |
| KR | 1020070039760 | 4/2007 |

OTHER PUBLICATIONS

"The CDMA2000 System for Mobile Communications" by Vanghi, Damnjanovic, and Vojcic © 2004 p. 20.*

* cited by examiner

*Primary Examiner* — Joshua Schwartz
(74) *Attorney, Agent, or Firm* — The Farrell Law Firm, P.C.

(57) ABSTRACT

An apparatus and method for setting a guard band with respect to an asynchronous Base Station (BS) in a broadband wireless communication system are provided. The BS includes a controller for generating a control signal to set a guard band when a time offset occurs between BSs; a mapper for mapping and outputting transmit data to a band, excluding the guard band, of a unique band of the BS according to the control signal; and an operator for multi-carrier-modulating data fed from the mapper.

14 Claims, 12 Drawing Sheets

COMMUNICATION APPARATUS AND METHOD IN BROADBAND WIRELESS COMMUNICATION SYSTEM

PRIORITY

This application claims priority under 35 U.S.C. §119(a) to a Korean Patent Application filed in the Korean Intellectual Property Office on Jul. 18, 2006 and assigned Serial No. 2006-66791, the contents of which are incorporated herein by reference.

BACKGROUND OF THE INVENTION

1. Field of the Invention

The present invention relates generally to a communication apparatus and method in a broadband wireless communication system, and in particular, to an apparatus and method for setting a guard band with respect to an asynchronous Base Station (BS) in a broadband wireless communication system.

2. Description of the Related Art

A number of radio communication technologies have been suggested as a candidate for rapid mobile communications. Among the suggested technologies, an Orthogonal Frequency Division Multiplexing (OFDM) scheme is the most dominant next-generation radio communication technology. In the future, it is anticipated that the OFDM technology will be adopted by most of the radio communication technologies. Wireless Metropolitan Area Network (WMAN) of Institute of Electrical and Electronics Engineers (IEEE) 802.16, which is called the 3.5G technology, is adopting the OFDM technology as the standard.

Since interference caused by asynchronization in the radio communication system may affect not only its own system but also other systems in general, time synchronization is quite important in the system operation. In response to this, various techniques have been suggested to acquire the synchronization between the BSs in the existing network. However, with respect to time offset in the network, there is no specific solution for addressing the performance degradation of the Mobile Station (MS) and the time offset.

When synchronization between the BSs is deprived in the synchronous network, the time offset is compensated over a wired or wireless network. In this case, the MS is subject to the interference increase and thus its Quality of Service (QoS) is not ensured.

Figure 1:
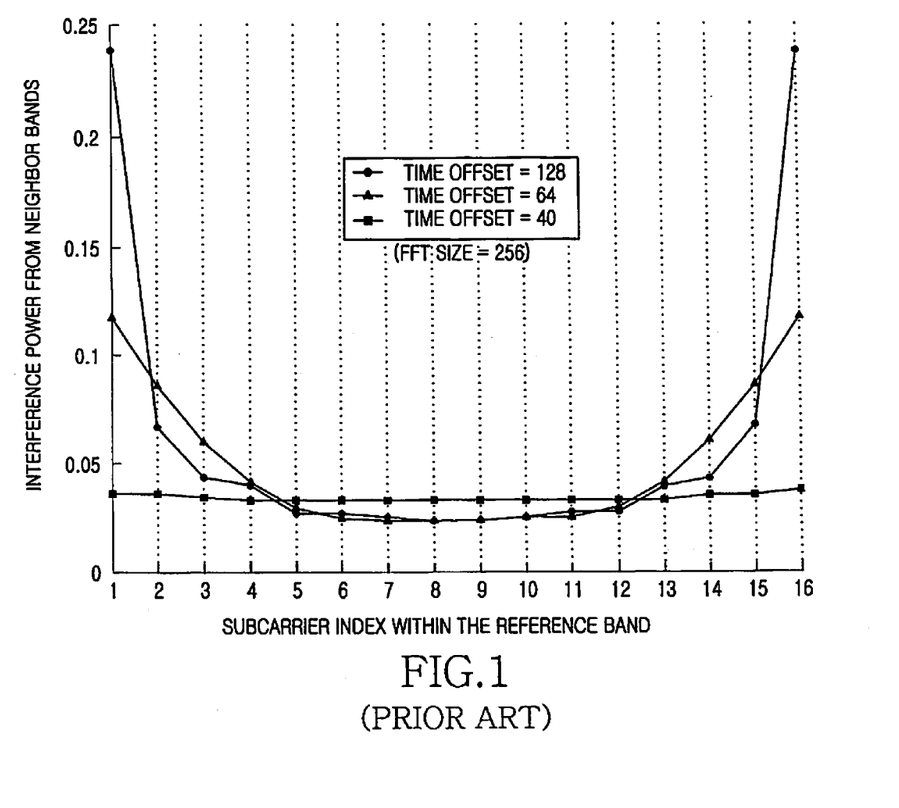
FIG. 1 is a graph of an interference power from neighbor bands at a conventional Mobile Station (MS) allocated a specific band.

FIG. 1 is a graph of an interference power of a conventional MS allocated a specific band from its neighbor bands.

In FIG. 1, when the specific band is allotted to the MS, the interference of the outer subcarriers is greater than the interference of the inner subcarriers. The influence of the interference results from the most adjacent subcarriers. Also, the greater time offset, the greater interference.

When the time offset occurs owing to a clock drift in the synchronous network, the MSs in the cell boundary cannot receive signals because of the interference from a neighbor BS (or a neighbor band). Also, when a new BS is plugged, the MSs cannot receive signals because of the time offset with the neighbor BS.

Accordingly, there is a need for a method of guaranteeing the QoS of the MS when there occurs the time offset owing to the clock drift or the newly plugged BS.

SUMMARY OF THE INVENTION

An aspect of the present invention is to substantially solve at least the above problems and/or disadvantages and to provide at least the advantages below. Accordingly, one aspect of the present invention is to provide an apparatus and method for guaranteeing QoS of MS when there occurs a time offset between BSs in a broadband wireless communication system.

Another aspect of the present invention is to provide an apparatus and method for setting a guard band for an asynchronous BS in a broadband wireless communication system.

A further aspect of the present invention is to provide an apparatus and method for adaptively adjusting a guard band when an asynchronous BS transmits a signal with the guard band set in a broadband wireless communication system.

A further aspect of the present invention is to provide an apparatus and method for setting a guard band for a new plugged BS in a broadband wireless communication system.

The above aspects are achieved by providing a BS in a broadband wireless communication system, which includes a controller for generating a control signal to set a guard band when a time offset occurs between BSs; a mapper for mapping and outputting transmit data to a band, excluding the guard band, of a unique band of the BS according to the control signal; and an operator for multicarrier-modulating data fed from the mapper.

According to one aspect of the present invention, an MS in a broadband wireless communication system includes a controller for adjusting a guard band according to a guard band set message received from a BS; an operator for multicarrier-demodulating and outputting the signal received from the BS; and a demapper for detecting and outputting data of a band excluding the guard band, from data fed from the operator under the control of the controller.

According to another aspect of the present invention, a communication method of a BS in a broadband wireless communication system includes setting a guard band when a time offset occurs between BSs; and mapping and transmitting transmit data to a band, excluding the set guard band, of an available unique band.

According to yet another aspect of the present invention, a communication method of an MS in a broadband wireless communication system includes receiving a guard band set message from a BS; setting a guard band according to the received guard band set message; and receiving a signal of the BS in a band, excluding the set guard band, of a unique band of the BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method for guaranteeing Quality of Service (QoS) of a Mobile Station (MS) when a time offset occurs between Base Stations (BSs) in a broadband wireless communication system.

Figure 2:
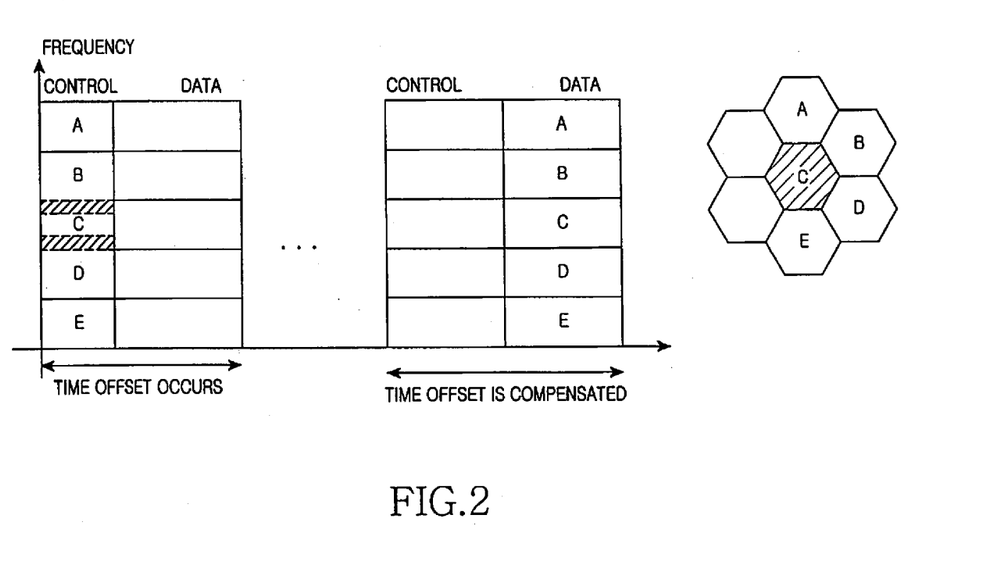
FIG. 2 illustrates a guard band allocation in a broadband wireless communication system according to the present invention.

FIG. 2 illustrates a guard band allocation in a broadband wireless communication system according to the present invention.

In FIG. 2, unique bands are allocated to BSs respectively. When the BS C is subject to the clock drift or is newly installed and thus becomes asynchronous with other BSs, the BS C transmits signals by setting a guard band. The guard band is set using a zero padding. In view of the bandwidth efficiency, it is preferable to set the guard band in a control channel interval which basically requires an accurate detection. Yet, the guard band may be set in a data channel when the time offset seriously affects the data channel. That is, the guard band can be set in the data channel as well as in the control channel according to the time offset.

Figure 3:
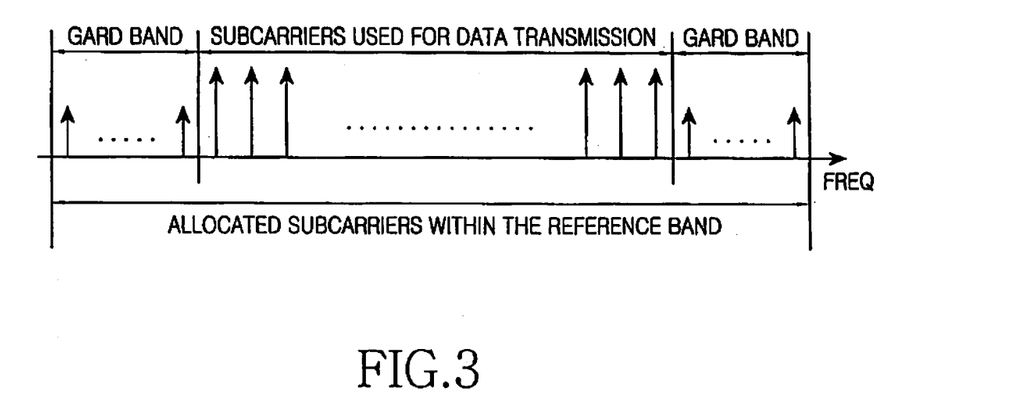
FIG. 3 illustrates the guard band set in a frequency axis according to the present invention.

FIG. 3 illustrates the guard band set in a frequency axis according to the present invention.

In FIG. 3, the guard band is set on both sides of the allocated unique band. High interference occurs to the outer subcarriers of the allocated subcarrier set. Thus, the guard band is set from the outside to the inside when the time offset occurs. To acquire the synchronization, the guard band is released from the inside to the outside. In other words, the size of the guard band is adaptively adjusted during the synchronization acquisition.

Figure 4:
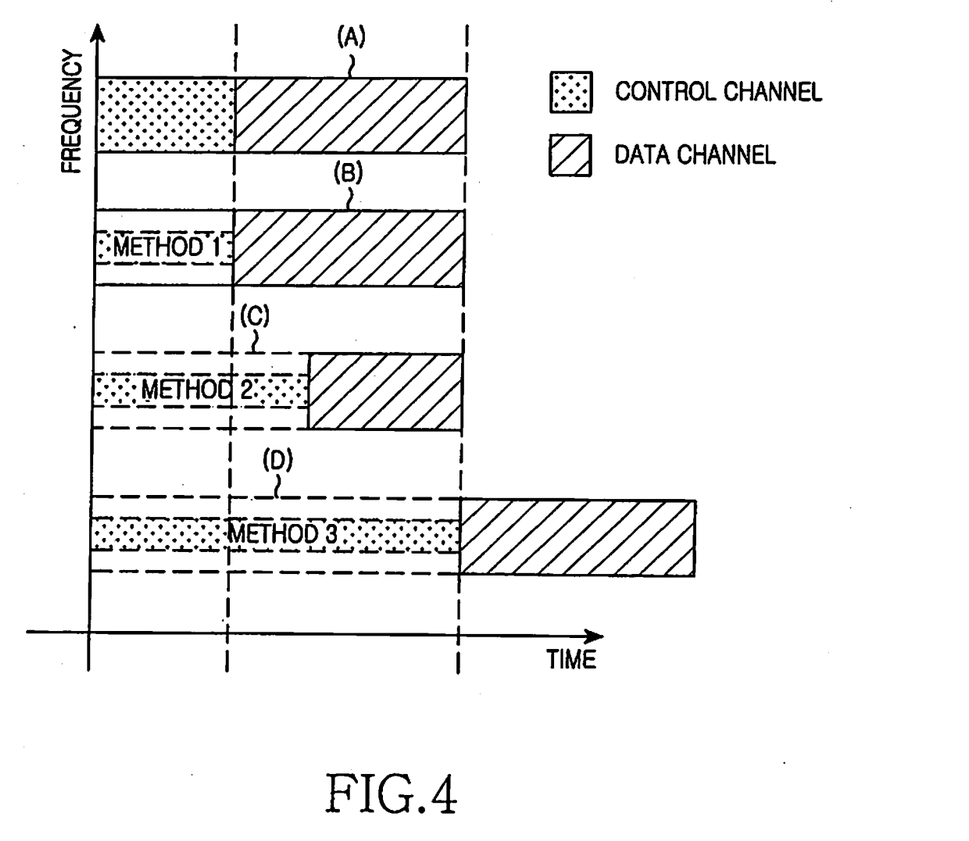
FIG. 4 illustrates transmission methods for setting the guard band according to the present invention.

FIG. 4 illustrates specific transmission methods for setting the guard band according to the present invention.

The advantage acquired from the guard band setting is the increase of Signal to Interference and Noise Ratio (SINR) of the MS. However, the decrease in available bandwidth is required to effectively transmit data. (B) shows the guard band set by reducing amount of control information, which does not affect the data channel. (C) shows the combinational adjustment of the transmission time and the information amount of the control information, which determines symbol lengths of the data transmission and the control information transmission in a certain ratio. (D) shows the guard band set by increasing the transmission time of the control information. As such, the guard band can be set using various methods. Preferably, a suitable method is used according to the given condition.

Figure 5:
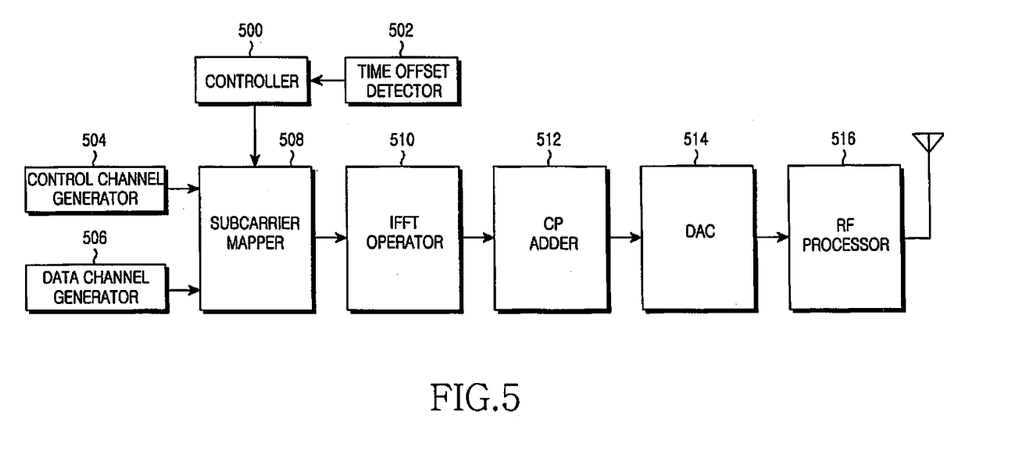
FIG. 5 illustrates a Base Station (BS) structure in a broadband wireless communication system according to the present invention.

FIG. 5 illustrates a BS structure in a broadband wireless communication system according to the present invention.

The BS of FIG. 5 includes a controller 500, a time offset detector 502, a control channel generator 504, a data channel generator 506, a subcarrier mapper 508, an Inverse Fast Fourier Transform (IFFT) operator 510, a Cyclic Prefix (CP) adder 512, a Digital-to-Analog Converter (DAC) 514, and a Radio Frequency (RF) processor 516.

The time offset detector 502 detects and outputs a time offset which may occur owing to the clock drift or a new plugged situation. In general, the time offset detection in the network not using a Global Positioning System (GPS) can be classified largely into two schemes. In one scheme, the BSs detect the time offset by mutually exchanging packets including a time stamp. In the other scheme, the BS detects the time offset based on information aggregated from the MSs.

The controller 500 compares the time offset fed from the time offset detector 502 with a reference value. When determining that the time offset is greater than the reference value, the controller 500 determines a size of the guard band to be set in the control channel and/or the data channel and controls the subcarrier mapper 508 according to the determined guard band size.

The control channel generator 504 generates and outputs a control channel signal containing control information. The data channel generator 506 generates and outputs a data channel signal containing traffic information. Herein, the control channel generator 504 and the data channel generator 506 include an encoder, a modulator, etc., which channel-encode and modulate information from an upper layer (e.g., MAC layer).

The subcarrier mapper 508 maps the control channel signal or the data channel signal from the control channel generator 504 or the data channel generator 506 to a unique band of the BS, and outputs the mapped signal. If the time offset occurs, the subcarrier mapper 508 sets the guard band under the control of the controller 500 and maps the input signal to the band (subcarriers) excluding the guard band. Zero is padded to the subcarriers corresponding to the guard band.

The Inverse Fast Fourier Transform (IFFT) operator 510 outputs sample data by IFFT-processing the data mapped to the subcarriers at the subcarrier mapper 508. The CP adder 512 appends a guard interval (e.g., CP) to the sample data fed from the IFFT operator 510.

The DAC 514 converts the sample data fed from the CP adder 512 to an analog signal and outputs the analog signal. The RF processor 516 includes a filter, a front-end unit, and so forth. The RF processor 516 RF-processes the signal output from the DAC 514 into a transformable form and transmits the signal on a transmit (Tx) antenna in a radio channel.

By comparing the time offset from the time offset detector 502 with the reference value and determining the synchronization acquisition, the controller 500 issues a control signal to release the guard band to the subcarrier mapper

508. The subcarrier mapper 508 releases the guard band under the control of the controller 500, maps the input signal to the entire band of the BS, and outputs the mapped signal.

When the guard band is set (and adjusted) or released, the controller 500 generates a control message to inform of the set or the release of the guard band and provides the control message to the control channel generator 504. When the guard band set message and the guard band release message are transmitted to the MS, and the MS detects the receive signal in the corresponding band based on the messages.

Figure 6:
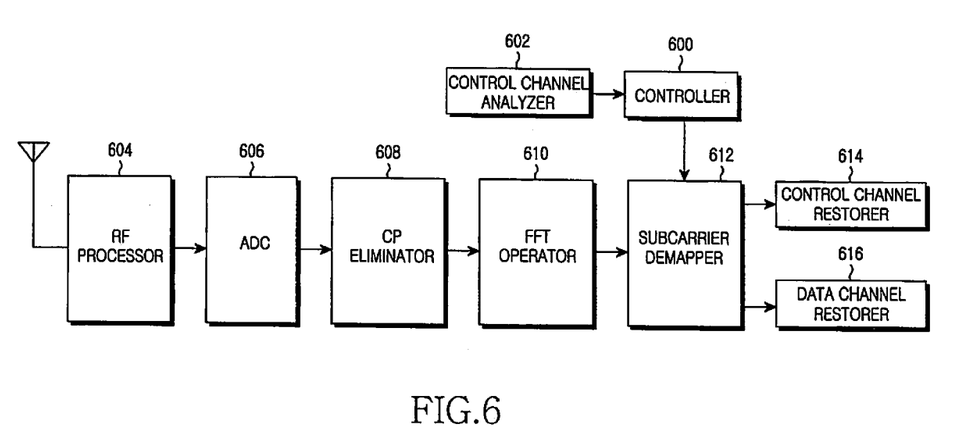
FIG. 6 illustrates an MS structure in the broadband wireless communication system according to the present invention.

FIG. 6 illustrates an MS structure in the broadband wireless communication system according to the present invention.

The MS of FIG. 6 includes a control channel analyzer 602, a controller 600, an RF processor 604, an Analog-to-Digital Converter (ADC) 606, a CP eliminator 608, an FFT operator 610, a subcarrier demapper 612, a control channel restorer 614, and a data channel restorer 616.

The control channel analyzer 602 analyzes the control message received from the BS. When receiving a guard band set message and a guard band release message, the control channel analyzer 602 extracts control information (guard band set information and guard band release information) from the received message and provides the extracted control information to the controller 600.

The controller 600 performs a corresponding control operation according to the control information fed from the control channel analyzer 602. When the guard band set information is input from the control channel analyzer 602, the controller 600 provides the subcarrier demapper 612 with a control signal to detect the signal from the band excluding the guard band. When the guard band release information is input, the controller 600 provides the subcarrier demapper 612 with a control signal to detect the signal in the entire band of the corresponding BS.

The RF processor 604 includes a front-end unit, a filter, and so forth. The RF processor 604 converts a high frequency band signal, which passed the radio channel, to a baseband signal and outputs the baseband signal. The ADC 606 converts the analog baseband signal fed from the RF processor 604 to a digital signal and outputs the digital signal.

The CP eliminator 608 removes a guard interval (e.g., CP) from the sample data fed from the ADC 606. The FFT operator 610 FFT-processes the sample data fed from the CP eliminator 608 and thus outputs frequency-domain data.

The subcarrier demapper 612 detects and outputs a corresponding band data from the frequency-domain data under the control of the controller 600. When the guard band set message is received from the corresponding BS, the subcarrier demapper 612 detects data in the band excluding the guard band. When the guard band release message is received from the BS, the subcarrier demapper 612 detects and outputs data in the entire band of the BS. In the control channel reception interval, the subcarrier demapper 612 provides the detected data to the control channel restorer 614. In the data channel reception interval, the subcarrier demapper 612 provides the detected data to the data channel restorer 616.

The control channel restorer 614 restores the control information by demodulating and decoding the data fed from the subcarrier demapper 612. The data channel restorer 616 restores the traffic information by demodulating and decoding the data fed from the subcarrier demapper 612. The control information (the control message) restored at the control channel restorer 614 is analyzed at the control channel analyzer 602.

As indicated above, the time offset may occur in the process of the device operation such as clock drift, or at a newly plugged BS. Operations of the present invention in those cases are illustrated now.

Figure 7:
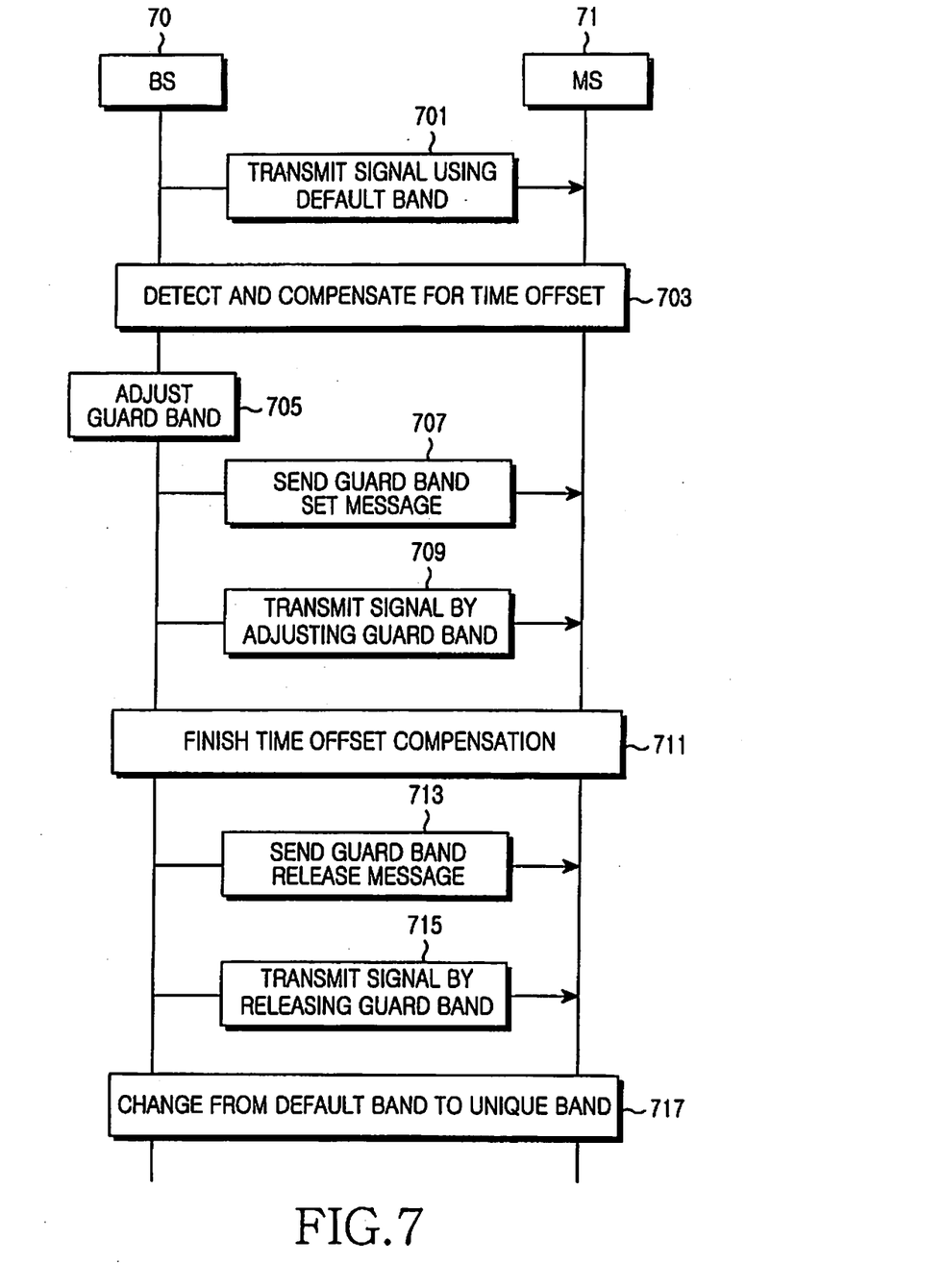
FIG. 7 illustrates a signal exchange process for setting the guard band for a plugged BS in the broadband wireless communication system according to an embodiment of the present invention.

FIG. 7 illustrates a signal exchange process for setting the guard band for a plugged BS in the broadband wireless communication system according to an embodiment of the present invention.

In FIG. 7, the plugged BS 70 transmits a signal in a default band used by the plugged BS in common in step 701. In this initial transmission, the BS 70 transmits the signal by setting guard band of a certain size in the default band. The guard band can be set in the control channel or in both of the control channel and the data channel.

In step 703, the BS 70 detects a time offset with other BSs and compensates for the detected time offset. The BS 70 may detect and compensate for the time offset in association with the MS 71 as shown in FIG. 7, or other BSs.

After compensating for the time offset, the BS 70 adjusts the size of the guard band based on the detected time offset in step 705. According to the present invention, the BSs have a lookup table which stores mapping relation between the time offset value and the guard band size, and thus adaptively adjust the guard band according to the detected time offset value.

After adjusting the guard band size, the BS 70 transmits a guard band set message including the guard band size information to the MS 71 in step 707. Next, the BS 70 transmits a signal by setting the guard band by the size in step 709.

In step 711, the BS 70 re-detects the time offset and finishes the time offset compensation when the time offset is less than a reference value. After finishing the time offset compensation, the BS 70 transmits a guard band release message to the MS 71 in step 713. In step 715, the BS 70 transmits a signal by releasing the guard band. Next, the BS 70 changes its communication band from the default band to the unique band allocated through a cell coordination in step 717.

The plugged BS transmits the signal by setting the guard band, to thus minimize the influence of the interference owing to the time offset of the BS on the MS.

Figure 8:
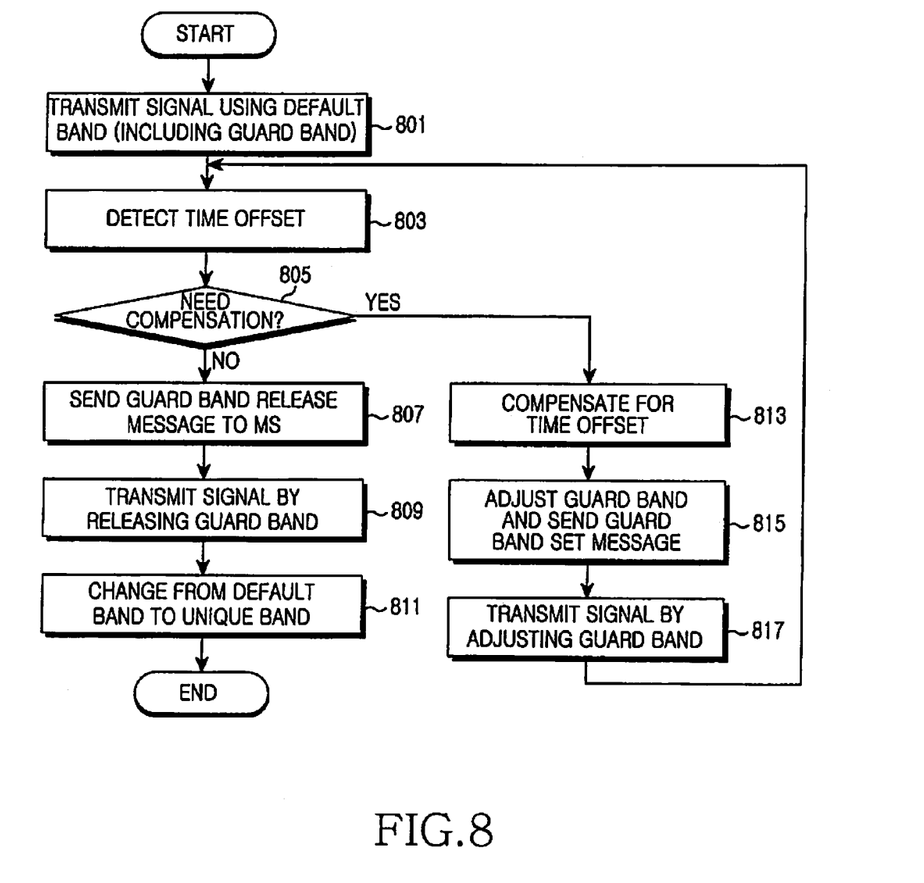
FIG. 8 illustrates operations of the plugged BS in the broadband wireless communication system according to the present invention.

FIG. 8 illustrates operations of the plugged BS in the broadband wireless communication system according to the present invention.

The BS 70 of FIG. 8 transmits a signal in a default band in step 801. In this initial transmission, the BS 70 sends the signal by setting a guard band of a certain size in the default band. The guard band can be set in the control channel or in both of the control channel and the data channel.

Next, the BS 70 detects a time offset with the other BS in step 803, and determines whether or not the time offset compensation is needed by comparing the detected time offset with a reference value in step 805.

When determining the time offset compensation is needed, the BS 70 compensates for the detected time offset in step 813. In step 815, the BS 70 adjusts the size of the guard band based on the detected time offset and sends a guard band set message including the size information of the guard band. The BS 70 transmits a signal by setting the guard band by the size in step 817 and returns to step 803.

When determining the time offset compensation is not needed, the BS 70 sends a guard band release message to the MS in step 807. In step 809, the BS 70 transmits a signal by releasing the guard band. In step 811, the BS 70 changes its communication band from the default band to its unique band allocated through the cell coordination.

Figure 9:
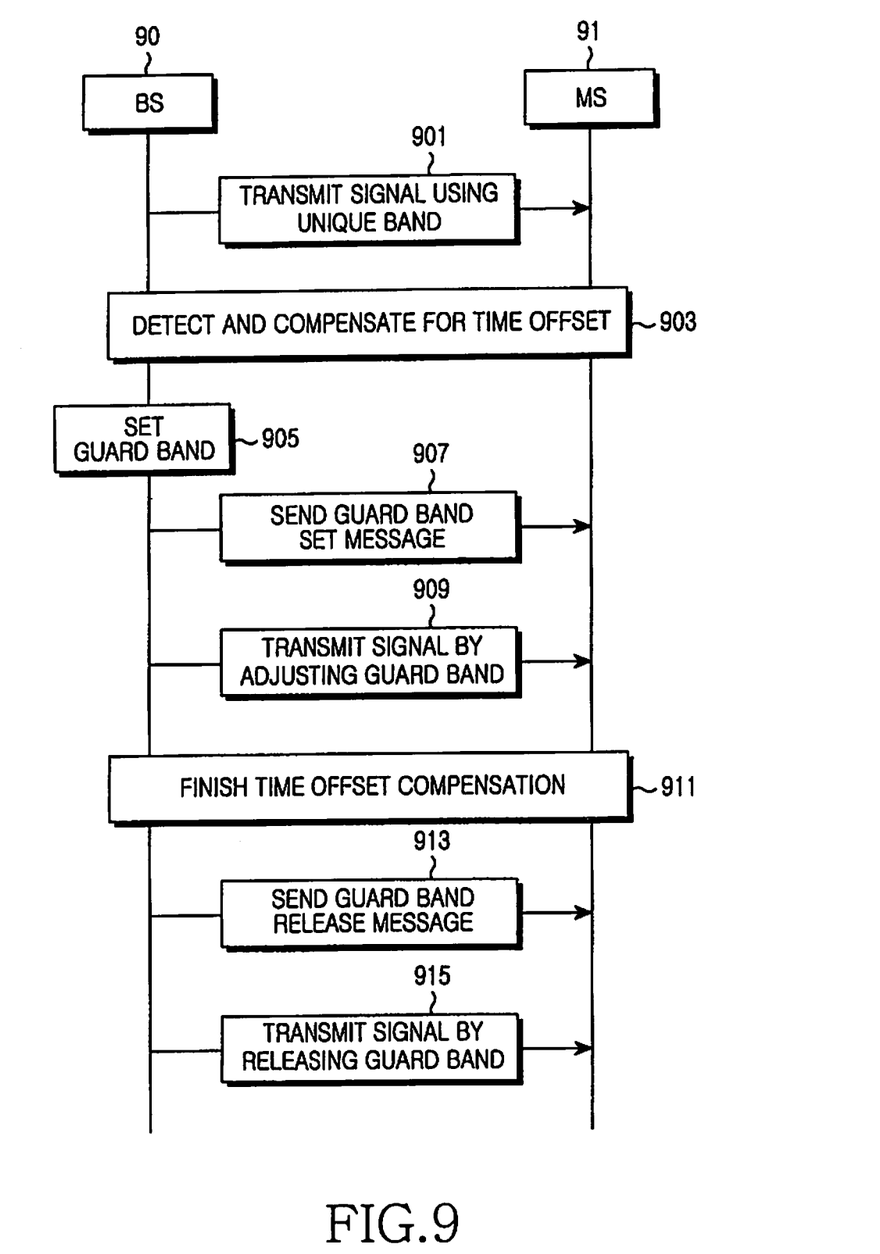
FIG. 9 illustrates a signal exchange procedure for setting the guard band for an asynchronous BS in its operation in the broadband wireless communication system according to another embodiment of the present invention.

FIG. 9 illustrates a signal exchange procedure for setting the guard band for an asynchronous BS in the operation in the broadband wireless communication system according to another embodiment of the present invention.

In FIG. 9, the BS 90 transmits a signal using its unique band in step 901. It is assumed that the unique band does not include the guard band.

In step 903, the BS 90 detects a time offset with to other BS and compensates for the detected time offset. The BS 90 may detect and compensate for the time offset in association with MS 91 as shown in FIG. 9, or in association with other BSs.

After compensating for the time offset, the BS 90 adjusts the size of the guard band based on the detected time offset in step 905. According to the present invention, the BSs have a lookup table which stores the mapping relation between the time offset value and the guard band size, and adaptively adjust the guard band according to the detected time offset value.

After adjusting the guard band size, the BS 90 sends a guard band set message including the guard band size information to the MS 91 in step 907. In step 909, the BS 90 transmits a signal by setting the guard band by the size. In doing so, the guard band can be set in the control channel or in both of the control channel and the data channel.

Next, the BS 90 re-detects the time offset and finishes the time offset compensation when the time offset is less than a reference value in step 911. Upon finishing the time offset compensation, the BS 90 sends a guard band release message to the MS 91 in step 913. The BS 90 transmits a signal by releasing the guard band in step 915.

The BS, which is asynchronous in its operation due to the clock drift, transmits the signal by setting the guard band. Therefore, the interference influence on the MS owing to the time offset of the BS can be minimized.

Figure 10:
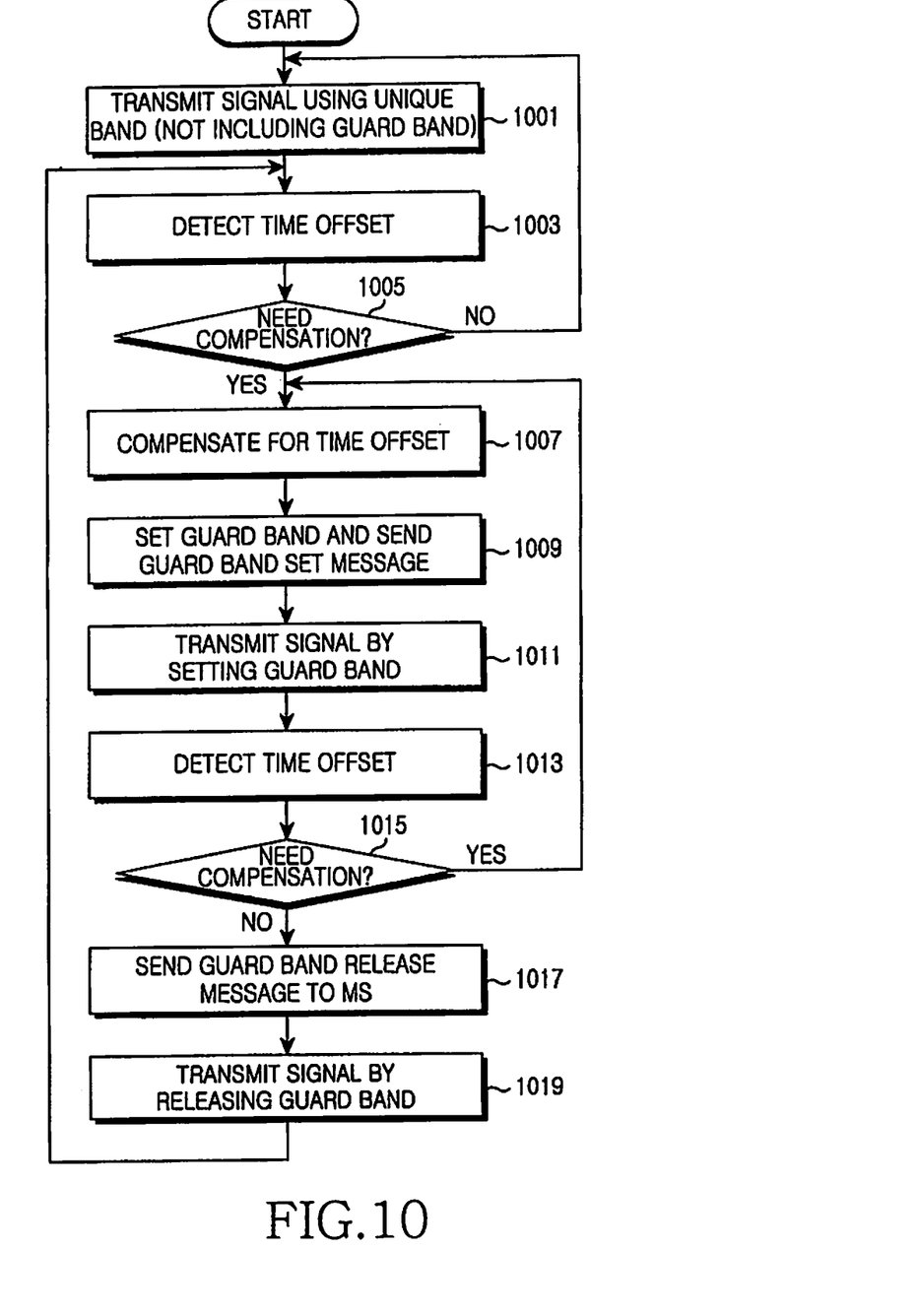
FIG. 10 illustrates operations of the asynchronous BS in the broadband wireless communication system according to another embodiment of the present invention.

FIG. 10 illustrates operations of the asynchronous BS in its process in the broadband wireless communication system according to the present invention.

In FIG. 10, the BS 90 transmits a signal using its unique band in step 1001. It is assumed that the unique band does not include the guard band.

Next, the BS 90 detects a time offset with other BS in step 1003, and determines whether or not the time offset compensation is needed by comparing the detected time offset with a reference value in step 1005.

Determining that the time offset compensation is not needed, the BS 90 returns to step 1001. However, determining that the time offset compensation is needed, the BS 90 compensates for the detected time offset in step 1007. In step 1009, the BS 90 adjusts the size of the guard band based on the detected time offset and sends a guard band set message including the guard band size information. In step 1011, the BS 90 transmits a signal by setting the guard band by the size. The guard band can be set in the control channel or in both of the control channel and the data channel.

After sending the signal with the guard band set, the BS 90 re-detects the time offset in step 1013 and determines whether or not the time offset compensation is necessary by comparing the detected time offset with a reference value in step 1015. Determining that the time offset compensation is needed, the BS 90 then goes back to step 1007 to compensate for the time offset. Determining that the time offset compensation is unnecessary, the BS 90 sends a guard band release message to MS in step 1017. Next, the BS 90 transmits a signal by releasing the guard band in step 1019 and then goes back to step 1003.

Figure 11:
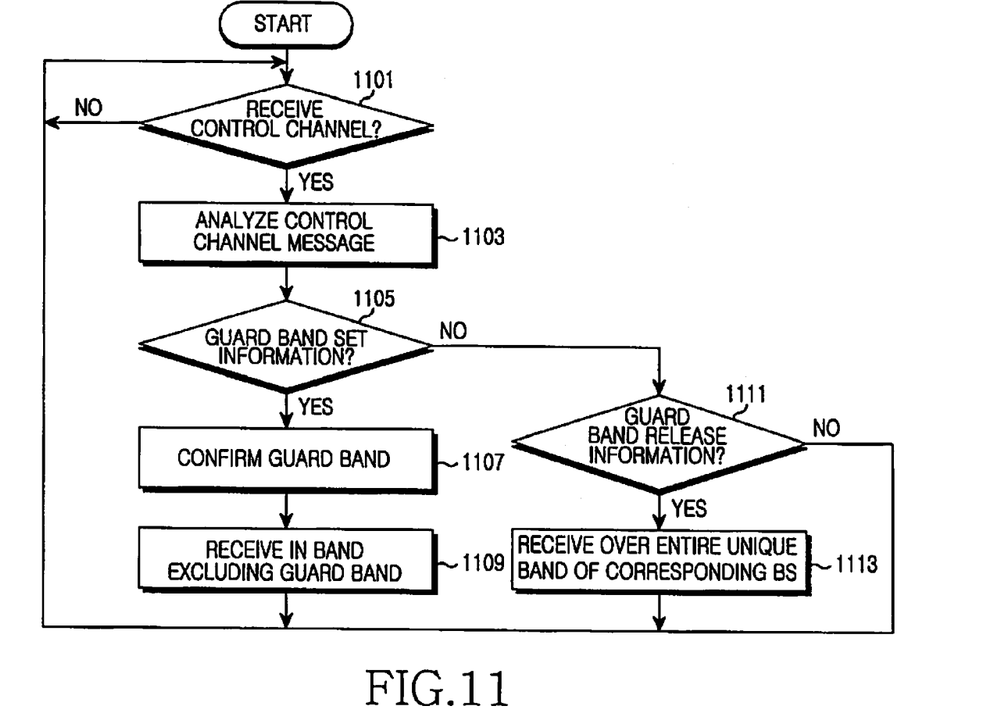
FIG. 11 illustrates MS operations in the broadband wireless communication system according to the present invention.

FIG. 11 illustrates MS operations in the broadband wireless communication system according to the present invention.

The MS of FIG. 11 checks whether a control channel message is received from the BS in step 1101. When receiving the control channel message, the MS analyzes control information of the received control channel message in step 1103.

In step 1105, the MS determines whether the control channel message includes guard band set information according to the analysis. When the guard band set information is included, the MS confirms the size of the guard band set by the BS in step 1107. Next, the MS receives the signal from the BS in the band excluding the guard band in step 1109 and returns to step 1101.

By contrast, when the control channel message includes guard band release information according to the analysis, the MS receives the signal from the BS over the entire unique band of the BS in step 1113 and then goes back to step 1101.

Figure 12:
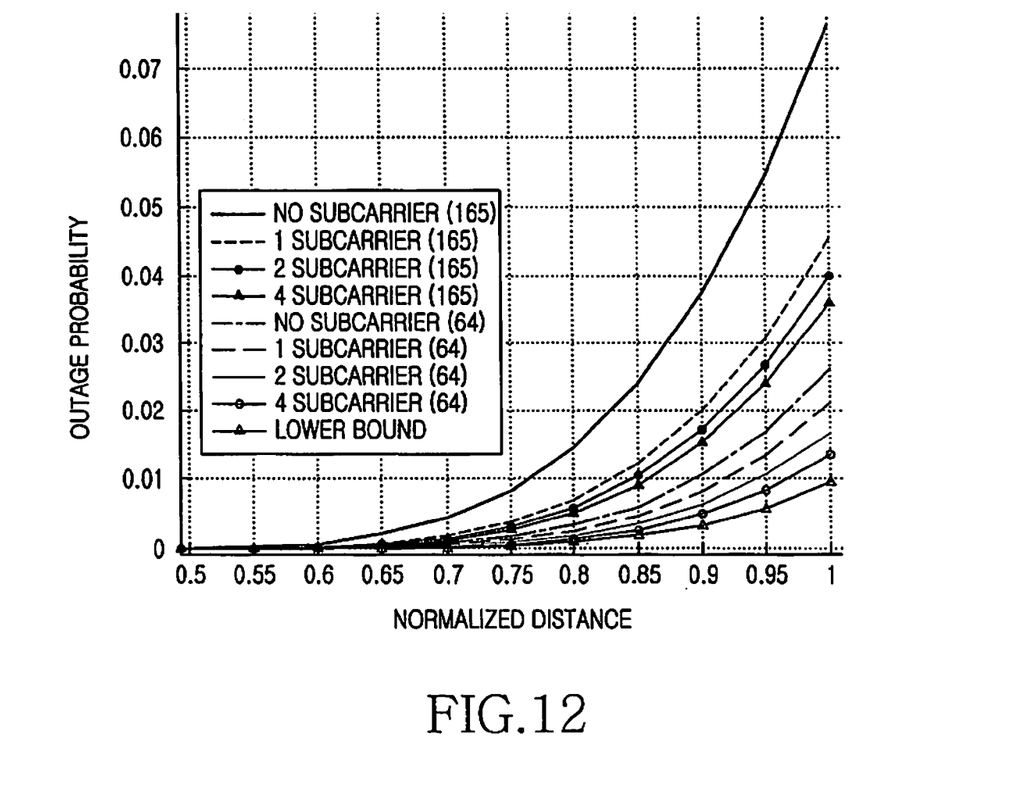
FIG. 12 is a graph showing a performance gain acquired when the guard band is set according to the present invention.

FIG. 12 is a graph showing a performance gain acquired when the guard band is set according to the present invention.

FIG. 12 shows the SINR outage probability based on the distance. The receive SINR decreases as it proceeds toward the cell boundary. Particularly, the greater time offset, the worse performance degradation. In this situation, the guard band (or the guard subcarriers) can mitigate the influence of the interference which occurs between the neighbor subcarriers. Also, as the size of the guard band increases, the outage probability can be lowered. In other words, the QoS of the MS in the cell boundary can be guaranteed by setting the guard band. Notably, the gain acquired from the guard band setting far more increases when the time offset rises.

As set forth above, by setting the guard band with respect to the interference occurring due to the time offset between the BSs, the interference between the subcarriers can be mitigated and the QoS of the MS can be guaranteed. In addition, the bandwidth loss can be minimized by gradually reducing the guard band in the process of the time offset compensation. Obviously, the present invention can reduce the outage probability of the MS in the cell boundary.

For instance, the present invention can be easily applied to a multihop relay system which employs a relay node or Relay Station (RS). When the BS and the RS provide services to the MS by dividing the band, the time offset may occur between the BS and the RS in their operations in spite of the accurate initial synchronization. In this case, the present invention can remove the interference influence on the MS. That is, when the time offset takes place, the BS or the RS transmits the signal by setting the guard band to thus ensure the QoS of the MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A base station in a wireless communication system, comprising:
   a transceiver; and
   a controller configured to:
   transmit, to a mobile station, a signal using a band in which a guard band is set, wherein a size of the guard band is pre-determined,
   detect a time offset value representing a time offset between a base station and another base station, adjust the size of the guard band based on table information indicating a relationship between the time offset value and a size of the guard band,
  adjust a length of a transmission period based on the adjusted size of the guard band and an amount of control information that is included in the signal, and
  transmit, to the mobile station, a signal using the band in which the guard band with the adjusted size is set during the transmission period.

2. The base station of claim 1, wherein the controller is configured to release the guard band set in the band if the time offset value is less than a reference value.

3. The base station of claim 1, wherein the controller is configured to adjust the amount of the control information, according to the size of the guard band.

4. The base station of claim 1, wherein the time offset value is based on one of a time offset occurring during operation of the base station, a time offset generating at a newly plugged base station, and a time offset occurring between the base station and a relay node.

5. The base station of claim 1, wherein the controller is configured to transmit a control message indicating the set of the adjusted guard band or release of the guard band to the mobile station.

6. A mobile station in a wireless communication system, comprising:
  a transceiver; and
  a controller configured to:
  receive, from a base station, a signal using a band in which a guard band is set, wherein a size of the guard band is pre-determined, and
  receive, from the base station, a signal using the band in which the guard band with an adjusted size is set during a transmission period,
  wherein the size of the guard band is adjusted, by the base station, based on table information indicating a relationship between a time offset value and a size of the guard band,
  wherein the time offset value represents a time offset between the base station and another base station, and
  wherein a length of the transmission period is adjusted, by the base station, based on the adjusted size of the guard band and an amount of control information that is included in the signal.

7. The mobile station of claim 6, wherein the controller is configured to release the guard band set in the band if a guard band release message is received from the base station.

8. A method for operating a base station in a wireless communication system, the method comprising:
  transmitting, to a mobile station, a signal using a band in which a guard band is set, wherein a size of the guard band is pre-determined;
  detecting a time offset value representing a time offset between the base station and another base station,
  adjusting the size of the guard band based on table information indicating a relationship between the time offset value and a size of the guard band;
  adjusting a length of a transmission period based on the adjusted size of the guard band and an amount of control information that is included in the signal; and
  transmitting, to the mobile station, a signal using the band in which the guard band with the adjusted size is set during the transmission period.

9. The method of claim 8, wherein, if the time offset value is less than a reference value, the guard band is released in the band.

10. The method of claim 8, further comprising:
  adjusting the amount of the control information, according to the size of the guard band.

11. The method of claim 8, wherein the time offset value is based on one of a time offset occurring during the operation of the base station, a time offset generating at a newly plugged base station, and a time offset occurring between the base station and a relay node.

12. The method of claim 8, further comprising:
  transmitting a control message indicating the set of the adjusted guard band or release of the guard band to the mobile station.

13. A method for operating a mobile station in a wireless communication system, comprising:
  receiving, from a base station, a signal using a band in which a guard band is set, wherein a size of the guard band is pre-determined; and
  receiving, from the base station, a signal using the band in which the guard band with an adjusted size is set during a transmission period,
  wherein the size of the guard band is adjusted, by the base station, based on table information indicating a relationship between a time offset value and a size of the guard band,
  wherein the time offset value represents a time offset between the base station and another base station, and
  wherein a length of the transmission period is adjusted, by the base station, based on the adjusted size of the guard band and an amount of control information that is included in the signal.

14. The method of claim 13, further comprising:
  releasing the guard band set in the band if a guard band release message is received from the base station.

* * * * *